US006715687B2

United States Patent
Berson

(10) Patent No.: US 6,715,687 B2
(45) Date of Patent: Apr. 6, 2004

(54) PEN AND SYSTEM FOR WRITING ENCODED LINES

(76) Inventor: William Berson, 9 Huckleberry La., Weston, CT (US) 06883

( * ) Notice: Subject to any disclaimer, the term of this patent is extended or adjusted under 35 U.S.C. 154(b) by 0 days.

(21) Appl. No.: 10/292,314

(22) Filed: Nov. 12, 2002

(65) Prior Publication Data

US 2003/0146286 A1 Aug. 7, 2003

Related U.S. Application Data

(60) Provisional application No. 60/353,611, filed on Feb. 1, 2002.

(51) Int. Cl.$^7$ .............................................. G06K 19/00
(52) U.S. Cl. .................. 235/487; 235/470; 235/472.03; 235/494; 345/166; 345/179
(58) Field of Search ................ 235/487, 470, 235/472.03, 494; 382/123; 345/179, 166

(56) References Cited

U.S. PATENT DOCUMENTS

| 5,091,975 | A | * | 2/1992 | Berger et al. ............... 382/123 |
| 5,109,426 | A | | 4/1992 | Parks |
| 5,111,512 | A | | 5/1992 | Fan et al. |
| 5,226,091 | A | | 7/1993 | Howell et al. |
| 5,247,137 | A | * | 9/1993 | Epperson ................. 178/19.04 |
| 5,251,265 | A | | 10/1993 | Dohle et al. |
| 5,294,792 | A | * | 3/1994 | Lewis et al. ................ 250/221 |
| 5,297,202 | A | * | 3/1994 | Kapp et al. .................... 705/75 |
| 5,501,535 | A | * | 3/1996 | Hastings et al. .............. 400/88 |
| 5,544,255 | A | | 8/1996 | Smithies et al. |
| 5,640,193 | A | | 6/1997 | Wellner |
| 5,774,602 | A | * | 6/1998 | Taguchi et al. ............. 382/314 |
| 5,852,434 | A | * | 12/1998 | Sekendur .................... 345/179 |
| 5,905,801 | A | | 5/1999 | Serinken |
| 6,095,634 | A | * | 8/2000 | Kishi ........................... 347/35 |
| 6,259,043 | B1 | * | 7/2001 | Clary et al. .............. 178/18.01 |
| 6,381,344 | B1 | | 4/2002 | Smithies et al. |
| 6,486,875 | B1 | * | 11/2002 | O'Donnell, Jr. ............. 345/179 |
| 6,536,972 | B2 | * | 3/2003 | Bramlett et al. .............. 401/16 |
| 6,550,997 | B1 | * | 4/2003 | King et al. .................... 401/45 |
| 6,556,694 | B2 | * | 4/2003 | Skoog ........................ 382/119 |
| 2001/0047476 | A1 | | 11/2001 | Yen et al. |

FOREIGN PATENT DOCUMENTS

GB 2312188 A * 10/1997 ........... B43K/25/00

OTHER PUBLICATIONS

Vablais et al. "Electronic Module for Sensing Pen Motion", Mar. 28, 2001, U.S. patent application Publication, US 2002/0181744 A1.*

* cited by examiner

Primary Examiner—Karl D. Frech
Assistant Examiner—Steven S. Paik
(74) Attorney, Agent, or Firm—John V. Stewart

(57) ABSTRACT

A writing pen that forms a line of ink from a sequence of small line segments of at least two lengths in a pattern that encodes information in the line. The information includes the location and time of writing, a pen identifier, and a pen usage counter. This allows a signature to be authenticated by scanning the signature, extracting the information, and comparing it to known times, locations, and pen uses of a claimed signatory. Autographs of famous persons can be authenticated this way. The pen has an ink jet head that produces the encoded line under control of a logic and data processor. A global positioning system, internal clock, pressure-sensing stylus, pen motion detector, event counter, and pen identification number, all in the pen body, provide inputs to the processor. The rate of production of the line segments is proportional to the writing speed.

3 Claims, 3 Drawing Sheets

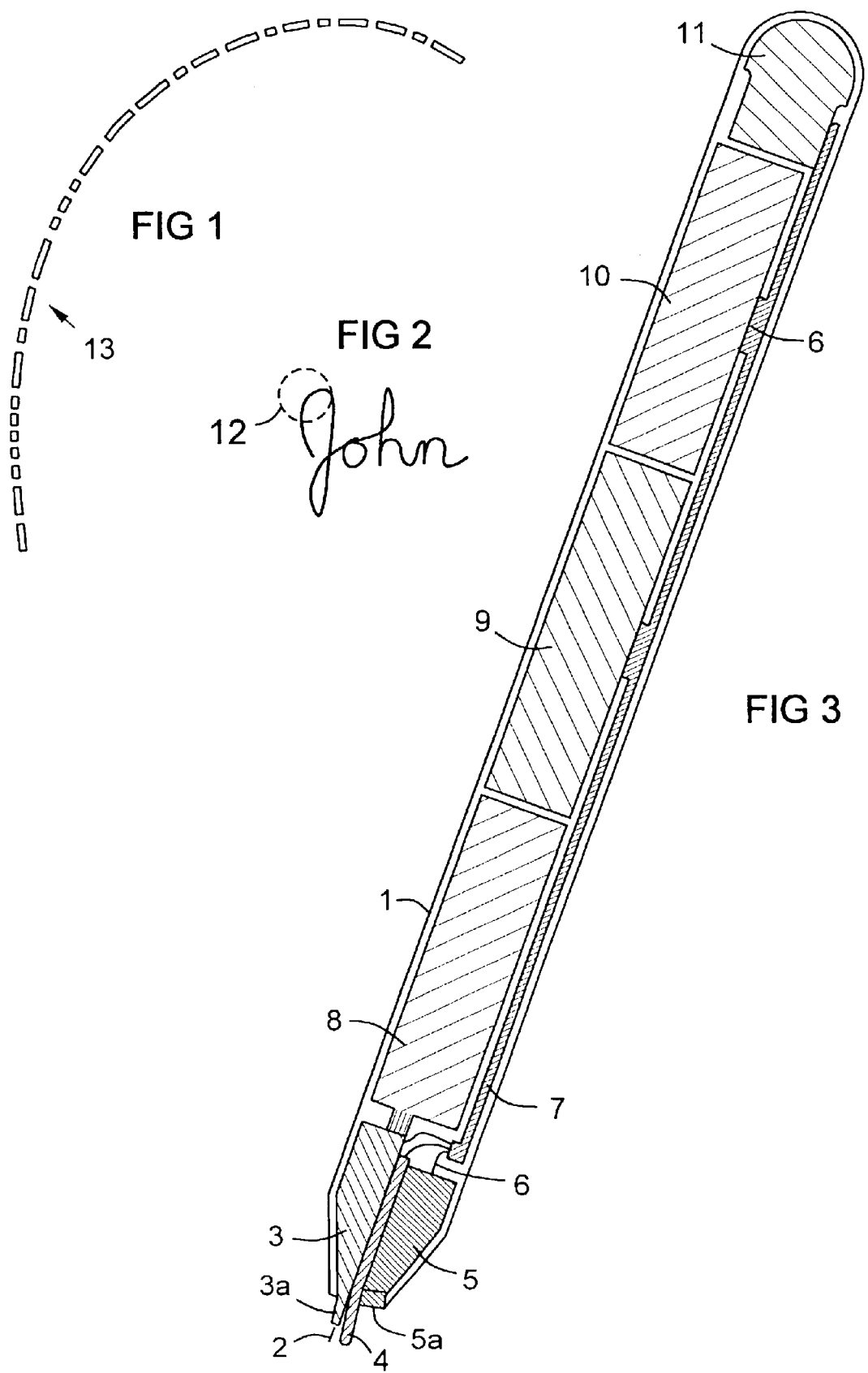

PEN AND SYSTEM FOR WRITING ENCODED LINES

CROSS-REFERENCE TO RELATED APPLICATIONS

This application claims the benefit of provisional patent application No. 60/353,611 filed Feb. 1, 2002.

BACKGROUND OF THE INVENTION

1. Field of the Invention

This invention relates generally to the field of document authentication, and more particularly to a machine and process for handwriting with embedded barcodes.

2. Description of Prior Art

Handwritten signatures have been used to authenticate documents and objects since the invention of writing. A person's signature is a unique easily recognizable identifier, which can be easily created with a pen or other writing implement, at almost any time and circumstance. The signatures of historical figures, sport and entertainment personalities are in themselves collectable, and when affixed to other objects convey cachet and are valued by collectors and historians. Lately, such signatures and signed objects such as baseballs have become commodities of popular culture and produced in quantity. They are often authenticated by questionable means such as encapsulation in plastic holders and association with an attached "certificate of authenticity".

Barcodes and other machine-readable codes have been used for the identification of goods, the sorting of paper forms and other related uses since the 1960's. Variable barcodes printed on demand have found applications such as retail, medical and forms processing. In some applications such as driver's licenses, barcodes have been employed for document authentication and identification The prior technology of signature authentication has been based on the forensic analysis of hand-written signatures, and inks used to produce them. This time honored approach requires the examination of the actual signature by an expert. Characteristics of the ink as well as the writing itself are examined and an opinion is rendered. The prior technology of signature analysis is deficient in that it requires the services of an expert, is expensive, time consuming and cannot typically be accomplished at the point of purchase or exchange. When a "certificate-of-authenticity" is used to authenticate an object, the certificate itself is subject to being counterfeited.

An example of electronic signature verification is found in U. S. Pat. No. 5,109,426, "Methods and Apparatus for Signature Verification". A writing pen with electronic motion sensors is connected to a computer. The pen communicates movement data to the computer during writing. A person records a set of his/her signatures using the pen. A subsequent signature by someone claiming to be this person is made using this same system. The motion and shape features of this current signature are compared statistically to the features and variability of the stored signatures to determine if the signature is authentic.

This type of system is unlike the present invention, which stores identifying data in the signature itself in barcode form so that a past signature can be authenticated by scanning data encoded in the signature.

Machine-readable codes such as barcodes are used for authentication by associating a bar-coded document such as a certificate-of-authenticity or special label with an object. Such authenticating documents attest to the provenance of an article, but this prior technology is deficient because the machinereadable codes are themselves subject to counterfeiting and duplication.

SUMMARY OF THE INVENTION

The primary object of the invention is to authenticate and verify handwritten signatures. Other objects are:

to authenticate and verify handwriting in general;

to timestamp signatures and other handwriting;

to authenticate collectibles, and deter counterfeiting;

to provide an audit trail for signed documents and objects;

to provide stand-alone or networked authentication;

to provide a writing instrument that creates a trail for the forensic investigation of writing made with it;

to provide a writing instrument that embeds digital data in the writing.

These objectives are achieved in a writing pen that forms a line of ink from a sequence of small line segments of at least two lengths in a pattern that encodes information in the line. The information includes the location and time of writing, a pen identifier, and a pen usage counter. This allows a signature to be authenticated by scanning the signature, extracting the information, and comparing it to known times, locations, and pen uses of a claimed signatory. Autographs of famous persons can be authenticated this way. The pen has an ink jet head that produces the encoded line under control of a logic and data processor. A global positioning system, internal clock, pressure-sensing stylus, pen motion detector, event counter, and pen identification number, all in the pen body, provide inputs to the processor. The rate of production of the line segments is proportional to the writing speed.

BRIEF DESCRIPTION OF THE DRAWINGS

The drawings constitute a part of this specification and include schematic examples of the invention, which may be embodied in various forms. Various aspects of the invention may be shown exaggerated or enlarged to facilitate understanding of the invention.

FIG. 1 is an enlarged view of a portion of handwriting script with data encoded in the line in the form of short line segments.

FIG. 2 is a sample of script from which the enlarged line section of figure is taken.

FIG. 3 is a conceptual sectional view of a pen according to the invention

REFERENCE NUMBERS

Figure 4:
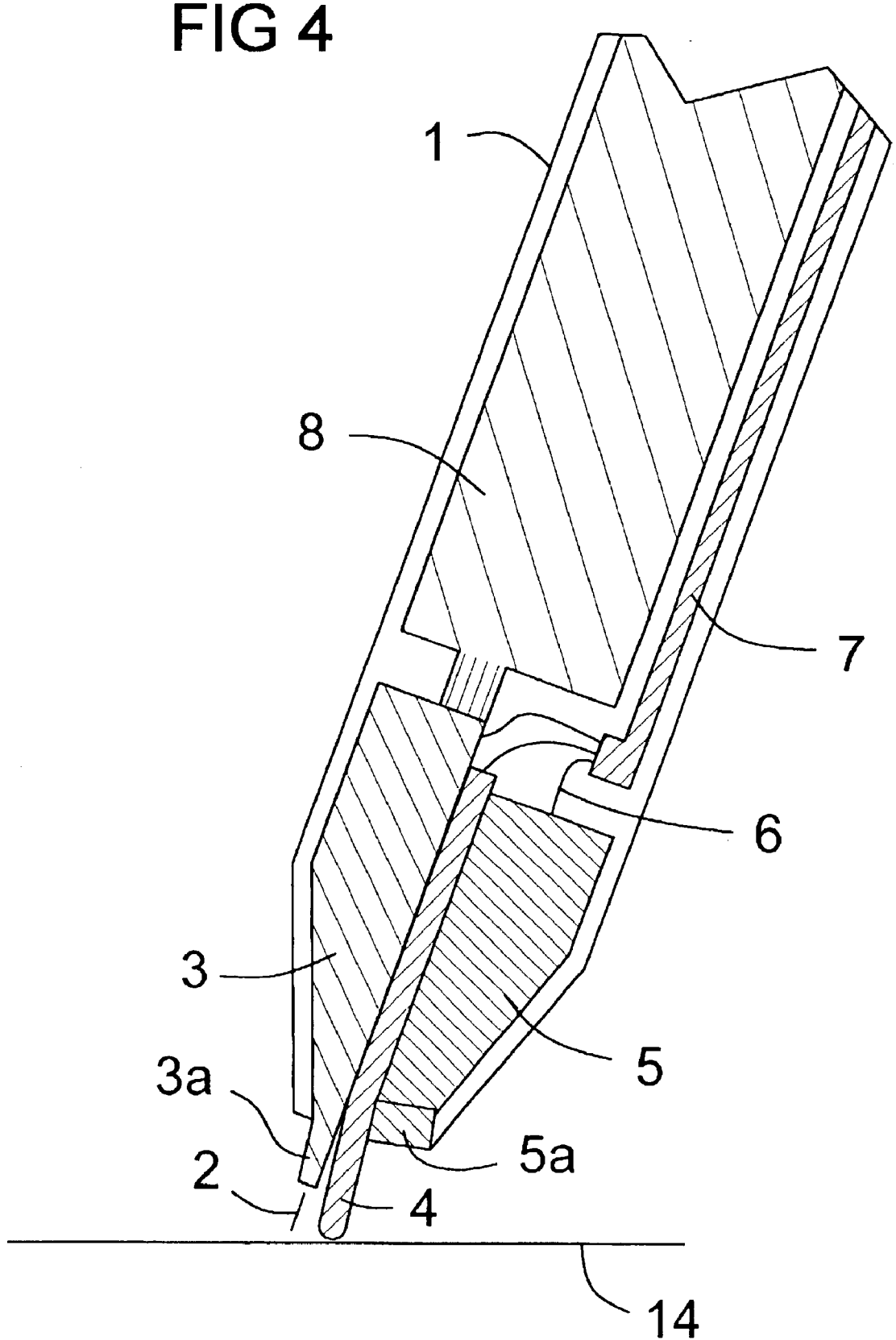
FIG. 4 is an enlarged sectional view of the writing end of the pen.

1. Pen body
2. Ink jet
3. Ink jet writing head
3a. Ink jet nozzle
4. Touch sensor stylus with pressure transducer
5. Motion sensor
5a. Motion sensor emitter/detector lens
6. Interface to data/power bus
7. Data and power distribution buses or connections
8. Ink reservoir 9. Central data and logic processing unit
10. Battery
11. Global positioning system (GPS) receiver
12. Portion of written line
13. Enlarged portion of written line
14. Writing surface

DETAILED DESCRIPTION

Detailed descriptions of the preferred embodiment are provided herein. The present invention may be embodied in various forms. Therefore, specific details disclosed herein are not intended as limiting, but rather as a basis for the claims and as a representative basis for teaching one skilled in the art to employ the present invention in virtually any appropriately detailed system, structure or manner.

FIG. 1 shows an enlarged portion of a written line 13 with an embedded code created with a writing implement or pen as shown in FIG. 3. As writing occurs, the written line is modulated to create a continuous authenticating code. In a preferred embodiment, the writing implement comprises an ink jet head 3, a touch sensor stylus 4, a led/motion sensor assembly 5, an ink reservoir 8, a data and logic processing unit 9, a battery 10, and a GPS receiver 11. These components are assembled in a pen body 1. The electronic components are powered and electronically connected to the processor via a data communication and power distribution bus 7.

The fact that writing is taking place, and the linear speed of creation of the written line, are determined by a touch sensor stylus 4 and a led/sensor assembly 5. The touch sensor stylus is a dummy writing tip with a pressure transducer that signals the processor when the pen tip is pressing on a writing surface. The led/sensor assembly is of the type used in computer mice. It signals the processor in proportion to the speed of motion of the stylus relative to the writing surface. It can be integrated into the stylus, or it can be adjacent the stylus as shown.

Various inputs are provided to the data and logic processing unit, including identification of the pen, geographic location and timing information from the GPS receiver, internal clock signals, and other identifying, authenticating information. Together with a pre-programmed coding scheme and optional encryption, these inputs are processed to create a series of timing pulses for writing head control. The timing pulses may result in a standard spatial bar-code signal, or made be encoded. The encryption key for encoding may be hardprogrammed into the control electronics, thereby making each pen unique. The writing thus created contains an intrinsic record of when and where the writing was done and which writing instrument was used.

FIG. 4 shows a detail of the writing pen during the writing process with ink droplets 2 being applied to a writing surface 14. A written pattern is formed by drops of ink 2 being emitted from an ink jet head nozzle 3a in a sequence of shorter and longer bursts, to form a pattern of shorter and longer line segments separated by gaps on the paper as shown in FIG. 1.

The pen is used in the conventional way by a person to create a signature or other writing, which contains embedded coding. The coding may be used for signature authentication or to convey other information. The coding may be encrypted to safeguard the contents and deter alteration of the embedded information.

Figure 5:
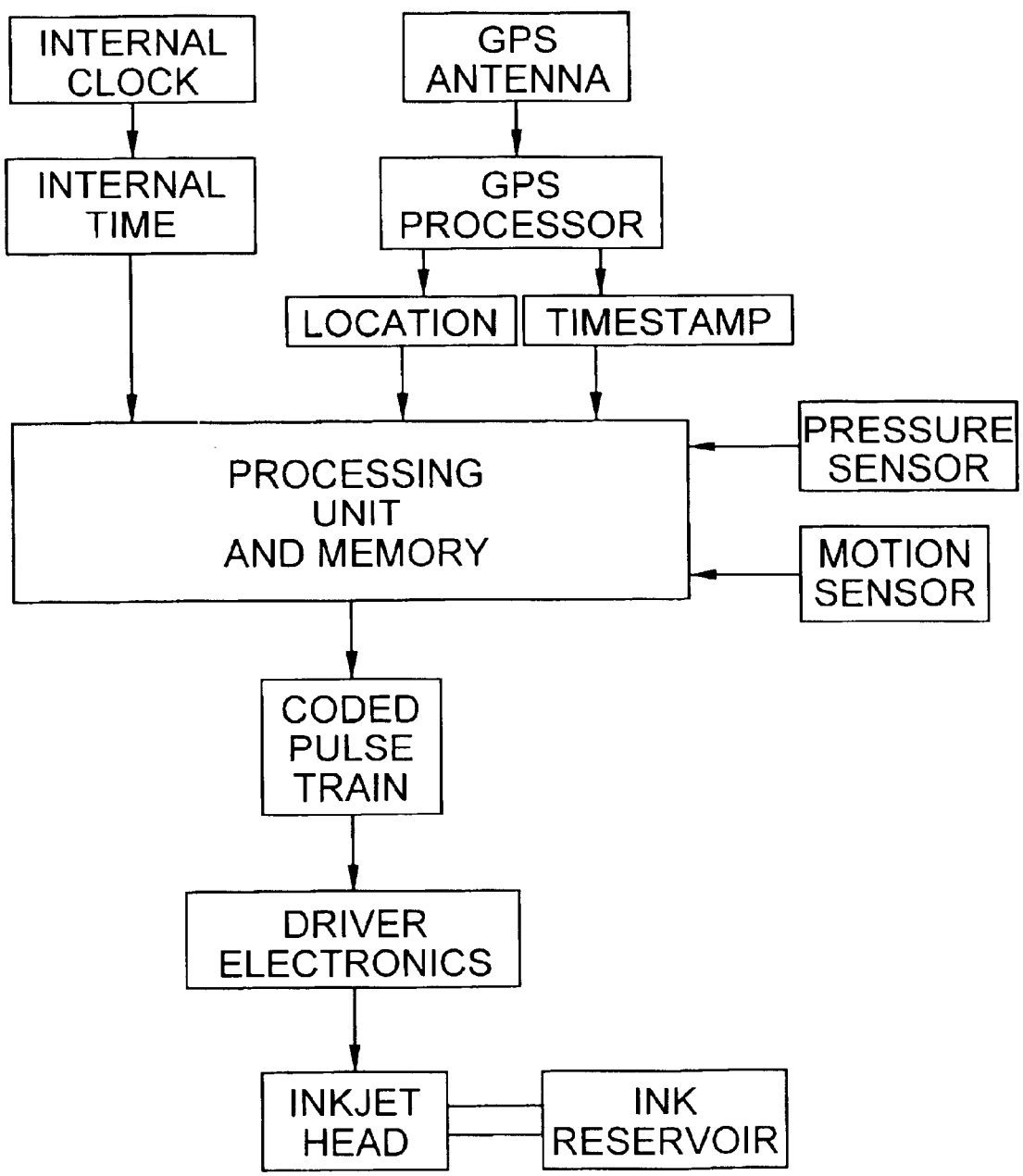
FIG. 5 is schematic diagram of components of a pen according to the invention.

As shown in FIG. 5, time signals (external timestamp) and position information (location stamp) from the GPS receiver are input to the central processing unit. An internal clock (internal timestamp), serial event counter (event stamp), and pen identification number, provide additional inputs. The processing unit organizes the above information and encodes it into a data stream. This data stream may optionally be encrypted. The pulse train is communicated to driver electronics that control ink flow to the writing head. In the preferred embodiment the ink flow is created by means of an ink jet writing head which is arranged to write on the paper or other surface.

The pulses may be of variable length, or they may consist of dot and dash streams of constant length. The pulses may be created synchronously with the internal clock or asynchronously according to the writing speed as detected by sensor 5. In the preferred embodiment, the pulses produce a linear code that is a standardized barcode such as "3 of 9".

A stylus 4 is extends from the writing end of the pen body, and is arranged to be in contact with the writing surface, and to thereby maintain the desired spacing between the ink jet nozzle and the surface. The end of the stylus in contact with the paper is smoothly rounded, and is made of, or coated with, a low friction material such as Teflon. The data stream pattern is transferred to paper or other surface during writing in the same manner as in a conventional writing implement.

An LED/optical motion sensor assembly 5 is arranged in the writing end of the pen body integral with, or adjacent to, the stylus to gate the flow of ink from the ink jet head. It senses and communicates to the processing unit the motion of the writing end of the body relative to a writing surface in contact with the stylus. Logic in the processing unit causes the data stream to be transmitted to the writing head at a signaling rate proportional to the writing speed. This normalizes the lengths of the line segments of the encoding scheme. Ink flow only takes place when the sensors detect movement and pressure of the pen stylus against a writing surface.

A conventional on-off switch (not shown) can be provided to activate the electronics. Preferably a conventional automatic shutoff timer is provided that turns the electronics off after a timed period of no pressure on the stylus. Optionally the electronics can be activated by a pressure sensor in the gripping area on the exterior of the pen body, so a person need only pick-up the pen and start writing.

When writing occurs, the pulse train with embedded information is created and expressed in the written line. As an example of the application of this process, consider an athlete or other famous personality who autographs various objects such as tickets, programs, and baseballs at various locations and times. These autographs become valuable objects and it is desirable to verify their authenticity. The writing process as described results in a conventional-appearing handwritten signature that contains within it authenticating information. This information can be used to authenticate an autograph when combined with a data log of the physical location of the personality whose signature is in question. For example, an autographed baseball can be authenticated by scanning the autograph and decoding the embedded data. The location, time, serializing and identification information thus retrieved is compared with a log of the personality's whereabouts and activities. If the embedded data asserts that a baseball was signed by Mickey Mantle on Oct. 3, 2002 and the data log records that in fact Mickey Mantle was (buried) in a particular memorial park in Brooklyn at the time, the autograph would be judged a forgery.

Scanning of the encoded line can be done visually with a magnifier, or manually and electronically by tracing the line with a scanning pen having a narrow scanning beam.

Although the present invention has been described herein with respect to a preferred embodiment, it will be understood that the foregoing description is intended to be illustrative, not restrictive. Modifications of the present invention will occur to those skilled in the art. All such modifications that fall within the scope of the appended claims are intended to be within the scope and spirit of the present invention.

I claim:

1. A pen for writing encoded lines, comprising:

a handwriting pen body having a writing end;

an ink reservoir in the body;

a data and logic processing unit in the body that includes memory with identification data that uniquely identifies the pen;

an ink jet writing head in the body in fluid communication with the reservoir, and in control communication with the processing unit;

a global positioning system receiver in the body in data communication with the processing unit;

a stylus extending from the wilting end of the body with a pressure transducer in signal communication with the processing unit for sensing pressure on the stylus; and logic in the data and logic processing unit that organizes data from the global positioning system receiver and the memory, and causes the processing unit to send a data stream to the writing head that produces a line of ink on a writing surface with embedded information encoded in the form of line segments of at least two different lengths, creating an encoded line during handwriting with the pen.

2. The pen of claim 1, further including an optical motion sensor in the writing end of the body, in data communication with the processing unit, that senses motion of the writing end of the body relative to a writing surface in contact with the stylus; and wherein the logic in the processing unit causes the data stream to be transmitted to the writing head at a rate proportional to the speed of motion of the writing end of the body relative to a writing surface in contact with the stylus.

3. A pen for writing encoded lines, comprising:

a handwriting pen body having a writing end;

an ink reservoir in the pen body;

a data and logic processing unit in the body that includes memory;

identification data in the memory that uniquely identifies the pen;

an event counter in memory that uniquely identifies a usage of the pen;

an internal clock in the processing unit that provides timestamp data to the processing unit;

an ink jet writing head in the pen body in fluid communication with the reservoir, and in control communication with the processing unit;

a global positioning system receiver in the pen body that provides the current geographic location of the pen to the processing unit;

a stylus extending from the writing end of the body with a pressure transducer in signal communication with the processing unit for sensing pressure on the stylus;

an optical motion sensor in the writing end of the body, in data communication with the processing unit, that senses motion of the writing end of the body relative to a writing surface in contact with the stylus;

compilation logic in the data and logic processing unit that organizes input data and signals from the global positioning system receiver, the stylus, and the motion sensor, along with the identification data, event counter, and timestamp, and causes the processing unit to send a control data stream to the writing head that produces a line of ink on the writing surface with embedded information encoded in the form of line segments of at least two different lengths during handwriting with the pen; and signaling rate control logic in the processing unit that causes the data stream to be transmitted to the writing head at a signaling rate proportional to the speed of motion of the writing end of the body relative to the writing surface in contact with the stylus.

* * * * *